(12) United States Patent
Wietelmann

(10) Patent No.: US 11,021,797 B2
(45) Date of Patent: Jun. 1, 2021

(54) STABILIZED, PURE LITHIUM METAL POWDER AND METHOD FOR PRODUCING THE SAME

(71) Applicant: Albemarle Germany GmbH, Frankfurt am Main (DE)

(72) Inventor: Ulrich Wietelmann, Friedrichsdorf (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 0 days.

(21) Appl. No.: 16/848,384

(22) Filed: Apr. 14, 2020

(65) Prior Publication Data
US 2020/0240020 A1    Jul. 30, 2020

Related U.S. Application Data

(60) Continuation of application No. 15/595,152, filed on May 15, 2017, now Pat. No. 10,655,229, which is a division of application No. 13/825,446, filed as application No. PCT/EP2011/066858 on Sep. 28, 2011, now abandoned.

(30) Foreign Application Priority Data

Sep. 28, 2010 (DE) ................. 10 2010 046 699.9

(51) Int. Cl.
*C23C 22/73*     (2006.01)
*B22F 1/00*      (2006.01)
(Continued)

(52) U.S. Cl.
CPC ............ *C23C 22/73* (2013.01); *B22F 1/0062* (2013.01); *B22F 1/0088* (2013.01);
(Continued)

(58) Field of Classification Search
CPC ...... C23C 22/73; B22F 1/0062; B22F 1/0088; B22F 2998/10; B22F 1/0059;
(Continued)

(56) References Cited

U.S. PATENT DOCUMENTS 5,567,474 A    10/1996   Dover et al.
5,776,369 A    7/1998    Dover et al.
(Continued)

FOREIGN PATENT DOCUMENTS

CN    101418406 A    4/2009
CN    101522343 A    9/2009
(Continued)

OTHER PUBLICATIONS

Komaba, S., et al., "Enhancement of Li-ion battery performance of graphite anode by sodium ion as an electrolyte additive" Electrochem. Comm., 2003, 5, pp. 962-966.
(Continued)

*Primary Examiner* — Andrew J. Oyer
(74) *Attorney, Agent, or Firm* — Marcy M. Hoefling; Nathan C. Dunn; Troy S. Kleckley

(57) ABSTRACT

The invention relates to a stabilized lithium metal powder and to a method for producing the same, the stabilized, pure lithium metal powder having been passivated in an organic inert solvent under dispersal conditions with fatty acids or fatty acid esters according to the general formula (I) R—COOR', in which R stands for $C_{10}$-$C_{29}$ groups and R' for H or $C_1$-$C_8$ groups.

10 Claims, 5 Drawing Sheets

Figure 1:
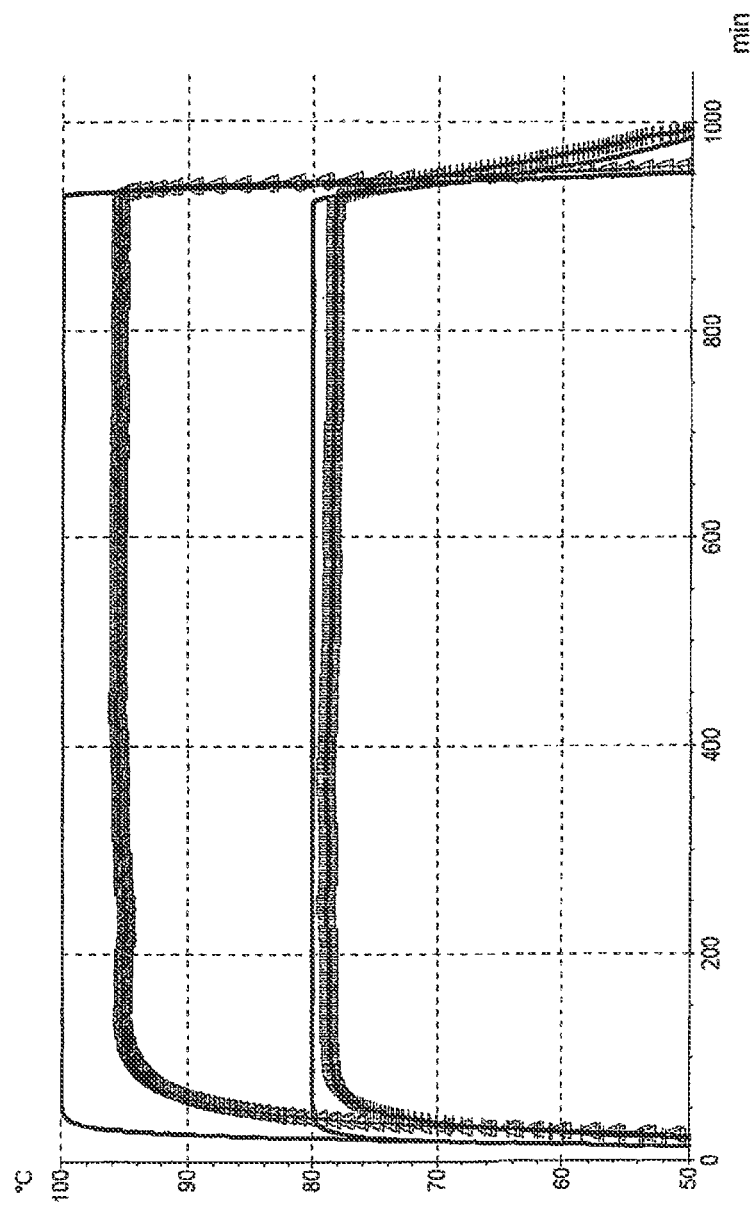

(51) Int. Cl.
*C22C 1/04* (2006.01)
*C22C 24/00* (2006.01)
*H01M 4/38* (2006.01)
*H01M 10/052* (2010.01)

(52) U.S. Cl.
CPC ............ *C22C 1/0408* (2013.01); *C22C 24/00* (2013.01); *H01M 4/382* (2013.01); *H01M 10/052* (2013.01); *B22F 1/0059* (2013.01); *B22F 2998/10* (2013.01); *B22F 2999/00* (2013.01); *Y10T 428/2982* (2015.01)

(58) Field of Classification Search
CPC ... B22F 2999/00; C22C 1/0408; C22C 24/00; H01M 4/382; H01M 10/052; Y10T 428/2982; Y02E 60/10
See application file for complete search history.

(56) References Cited

U.S. PATENT DOCUMENTS

| | | |
|---|---|---|
| 7,588,623 B2 | 9/2009 | Dover et al. |
| 2005/0130043 A1 | 6/2005 | Gao et al. |
| 2007/0006680 A1* | 1/2007 | Dover ............ B22F 9/06 75/331 |
| 2008/0268339 A1 | 10/2008 | Suzuki |
| 2008/0283155 A1 | 11/2008 | Yakovleva et al. |
| 2009/0035663 A1 | 2/2009 | Yakovleva et al. |
| 2009/0061321 A1 | 3/2009 | Yakovleva et al. |
| 2010/0024597 A1 | 2/2010 | Dover et al. |
| 2011/0226987 A1 | 9/2011 | Yakovleva et al. |

FOREIGN PATENT DOCUMENTS

| | | |
|---|---|---|
| JP | H08-11694 B | 2/1996 |
| WO | 1997/06910 A | 2/1997 |
| WO | 2007/005983 A2 | 1/2007 |
| WO | 2008/045557 A1 | 4/2008 |

OTHER PUBLICATIONS

Vereshchagin et al. "The Triglyceride Composition of Linseed Oil," J. Am. Oil Chemists' Soc., 1965, 42, 970-974.

* cited by examiner

STABILIZED, PURE LITHIUM METAL POWDER AND METHOD FOR PRODUCING THE SAME

REFERENCE TO RELATED APPLICATIONS

This application is a continuation of commonly-owned and co-pending U.S. application Ser. No. 15/595,152, filed May 15, 2017, which is a divisional of commonly-owned and co-pending U.S. application Ser. No. 13/825,446, filed Mar. 21, 2013, which application is a § 371 of International Application No. PCT/EP2011/066858, filed Sep. 28, 2011, and claims priority from German Patent Application No. 10 2010 046 699.9, filed Sep. 28, 2010, the disclosures of which are incorporated herein by reference.

Described are a stabilized lithium metal powder and a method for producing stabilized, pure lithium metal powder by dispersion in an organic, inert solvent in the presence of fatty acids or fatty acid esters.

Lithium is an alkali metal. As with the heavy element homologues of the first main group, it is characterized by strong reactivity relative to a plurality of materials. It reacts violently, often igniting, with water, alcohols and other materials containing protic hydrogen. Exposed to air, it is unstable reacting with oxygen, nitrogen and carbon dioxide. This is why it is usually handled under an inert gas (noble gases, such as argon) and stored under a protective layer of paraffin oil.

Furthermore, it reacts with many functionalized solvents, even if these do not contain any protic hydrogen. For example, cyclic ethers such as THF are opened by ring cleaving, ester and carbonyl compounds are generally lithiated and/or reduced. The reaction of the named chemicals and/or environmental materials is often catalyzed by water. Correspondingly, lithium metal can be stored and processed over longer periods of time in dry air, because it generates a somewhat stable passivation layer that prevents any further corrosion from occurring. Similar comments apply for functionalized solvents, for example N-methyl-2-pyrrolidone, that are substantially less reactive relative to lithium in a water-free form than, for example, with water contents of >several 100 ppm.

A number of corrosion-reducing coating methods was developed to improve the storage life of lithium metal and security during processing. Correspondingly, U.S. Pat. Nos. 5,567,474 and 5,776,369, for example, disclose treating lithium metal with $CO_2$. For the coating, liquid lithium in an inert hydrocarbon is typically brought in contact with at least 0.3% $CO_2$ for at least 1 minute. However, the protection that is thus achieved is insufficient for many applications, especially for the prelithiation of battery electrode materials in a N-methyl-2-pyrrolidone (NMP) suspension.

A further method for stabilizing lithium metal provides for heating the same in excess of the melting point thereof, stirring the melted lithium and bringing it into contact with a fluorinating agent, for example perfluoropentylamine (WO 2007/005983 A2). Disadvantageously, however, fluorinating agents are often toxic or caustic, which is why they are used with great caution in industrial practice.

A further method for a protective surface treatment of lithium metal envisions providing the same with a wax layer, for example a polyethylene wax layer (WO 2008/045557 A1). It is disadvantageous, however, that this method requires the use of quite a large quantity of coating agent. The examples that are listed in the mentioned patent application specify approximately 1%.

US 2008/0283155 A1 discloses a method for stabilizing lithium metal that is characterized by the following steps: a) heating lithium metal powder in excess of the melting point thereof in order to produce melted lithium metal; b) dispersing the melted lithium metal; and c) bringing the melted lithium metal in contact with a phosphor-containing substance in order to generate a substantially continuous protective layer of lithium phosphate on the lithium metal powder. Handling acidic, caustic materials (phosphoric acid) is generally disadvantageous, but particularly in the presence of lithium metal: upon being brought in contact with each other, both materials react violently releasing an enormous amount of heat. Furthermore, explosive hydrogen gas is generated when reacting lithium metal with phosphoric acid.

Finally, US 2009/0061321 proposes the preparation of a stabilized lithium metal powder with a substantially continuous polymer coating. The polymer can be selected from the group comprising polyurethanes, PTFE, PVC, polystyrol, etc. Disadvantageously, this method provides the protected lithium metal with an undefined surface coating of organic substances that could interfere during any subsequent use thereof, for example the prelithiation of electrode materials.

Therefore, the object of the invention seeks to provide a method for preparing lithium metal powder with a passivating cover layer
- that does not require the use of gaseous or acidic, caustic or toxic passivation agents;
- that does not result in the formation of undefined organics, especially not in organic polymers; and
- that causes the formation of a passivating protective layer made of an inorganic, poorly soluble salt film on the lithium surface; and
- the surface coating of which does not interfere with any use, for example, as prelithiation agent for anode materials.

A lithium powder of this kind should be stable for days up to approximately 50° C. and in the presence of polar, reactive solvents, such as are used in the preparation of electrode coatings (for example, NMP).

According to the invention, the object is achieved by using saturated and/or unsaturated fatty acids and/or fatty acid esters according to the general formula I

$$R—COOR' \quad (I)$$

as passivation agent, wherein R denotes $C_{10}$-$C_{29}$ moieties, while R' stands for H or $C_1$-$C_8$ moieties. A pure lithium, meaning particularly a lithium quality poor in sodium, is used as lithium source. Surprisingly, it was found that using a lithium metal that is poor in sodium, it is possible to obtain especially stable products that are safe to handle.

First, the lithium is heated under an inert gas (noble gas, for example dry argon) in an organic, inert solvent or solvent mixture (typically hydrocarbon-based) in excess of the temperature when melting occurs (180.5° C.). This process is possible at standard pressure with the use of solvents having boiling temperatures>180° C. (for example, undecane, dodecane or the corresponding commercially available mineral oil mixtures, for example Shellsols). If, on the other hand, more volatile hydrocarbons are used such as, for example, hexane, heptane, octane, decane, toluene, ethylbenzene or cumene, the melting process occurs in an enclosed vessel and under pressurized conditions.

The passivation agent is added when melting is complete, and operation of the agitator system that is used for preparing the dispersion (typically a dispersion disc) is started. The precise dispersion parameters (meaning mainly the rotation speed and the dispersion time) depend on the desired particle size. They further depend on the viscosity of the dispersion solvent as well as the individual geometric parameters of the agitation element (for example, diameter, precise position and toothing size). The person skilled in the art is easily able to conduct the corresponding experiments for delivering the desired particle size.

If lithium particles are to be prepared having a grain size in the range of between 5 and 100 μm, the agitator frequency is generally between 1,000 and 25,000 upm, preferably 2,000 to 20,000 upm. The dispersion time, meaning the time period during which the dispersion tool operates at full power, is between 1 and 30 minutes, preferably between 2 and 15 minutes.

The passivation agent therein can be added already together with the metal and solvent prior to the beginning of the heating phase. Preferably, however, it is only added after the metal has melted, meaning at temperatures>180° C. The addition can be in an uncontrolled fashion (meaning in one portion) during the dispersion process. Preferably, the passivation agent is added over a time period of approximately 5 s to 1000 s, especially preferred 30 s to 500 s.

Fatty acids or fatty acid esters are used as passivation agents. These auxiliary agents have the advantage that they are commercially available and non-toxic, without remarkable steam pressure, and they do not generate a disturbing film made up of the elements oxygen, carbon and hydrogen on the metal surface. Examples of preferred passivation agents are: olein (oleic acid), stearic acid, palmitinic acid, lauric acid, myristinic acid, margaric acid, palmitoleinic acid, linolic acid, linolenic acid, either in pure form or as mixtures thereof. Furthermore, the esters thereof can be used, for example fatty acid glycerides or the esters with monovalent alcohols, for example ethylates, propanolates or butylates. Natural products, such as rapeseed oil, olive oil, sunflower oil or linseed oil can especially preferably be used. Of the named passivation agents, generally 0.1 to 50 g are used per kg lithium metal. The use of 1 to 10 g passivation agent per kg lithium metal is preferred. The specific quantity depends on the concentration of the functional groups (these are, for example, carboxylic acid groups or carboxylate groups) inside the passivation agent, as well as on the degree of fineness of the metal powder that is to be generated: the higher the degree of fineness, the greater is the specific surface, and consequently the higher the need for passivation agent.

The lithium metal is used in the pure form thereof, meaning the metallic contaminations must be below 500 ppm in total. In particular, the sodium content is limited to a maximum of 200 ppm. The Na content is preferably <100 ppm, especially preferred<50 ppm. Lithium metal powders correspondingly poor in sodium that have been passivated according to the above-described method by means of fatty acid or fatty acid esters surprisingly prove especially stable when they come in contact with reactive, polar solvents, for example N-methyl-2-pyrrolidone.

The mean particle size of the metal powder according to the invention is max. 200 μm, preferably max. 100 μm, and especially preferred max. 50 μm.

Within the meaning of the invention, it is also possible to stabilize metal powders, which have been passivated with fatty acids or fatty acid esters, even more strongly by the application of an additional coating. Expedient coating agents are, for example, phosphor-containing compounds (such as phosphoric acid, lithium tris(oxalato)phosphate), fluorinating agents (for example perfluoropentylamine), waxes (for example, polyethylene wax) or polymer coatings (for example, with PU, PTFE, PVC or polystyrol). Said additional passivation is done in a hydrocarbon solvent at temperatures below the melting point of lithium (meaning<180.5° C.).

The lithium metal powder according to the invention demonstrates in the differential scanning calorimetry test (DSC test), when in suspension with N-methyl-2-pyrrolidone (water content<ca. 200 ppm) at a minimum of 15 hours storage at 50° C., and especially preferred at 100° C., no significant exothermal effect, particularly no "run-away phenomenon." This behavior is explained in further detail in the following examples.

Subsequently, the invention will be illustrated in further detail using an example, a comparison example and five figures without the claimed scope of protection intended to be limited in any way.

Figure 2:
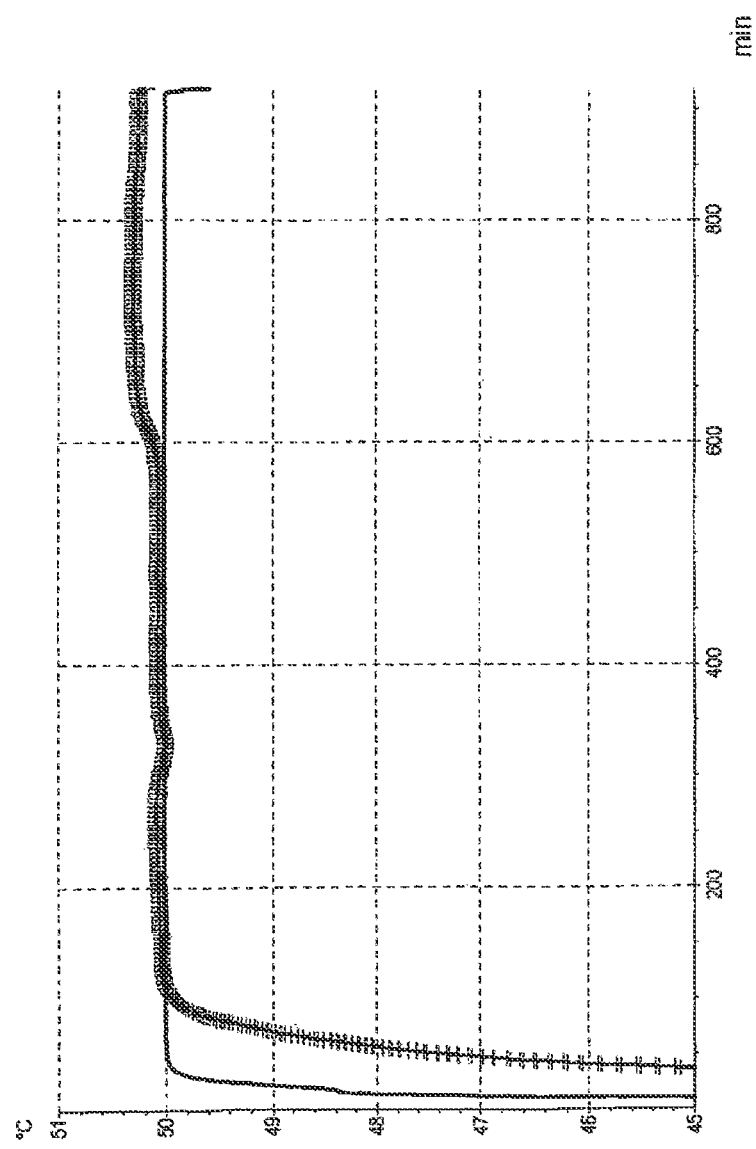
Figure 3:
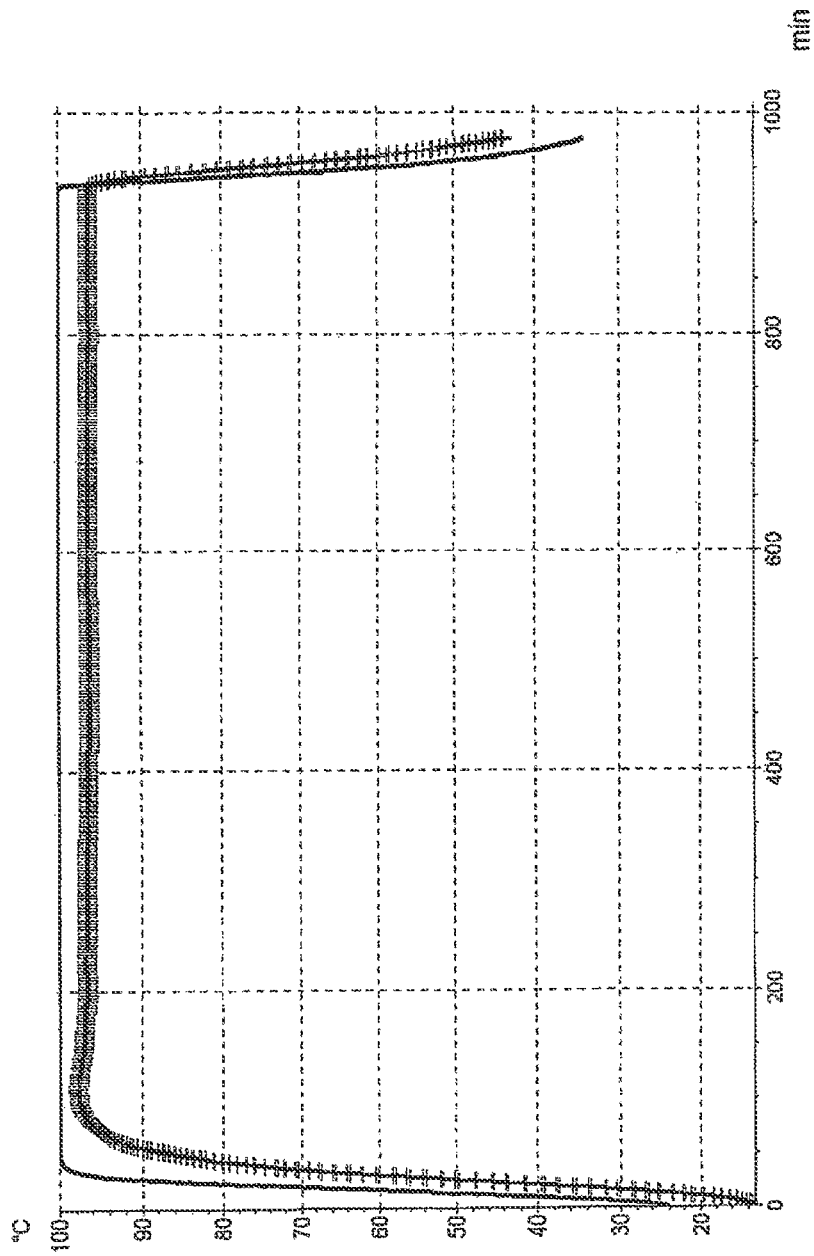
Figure 4:
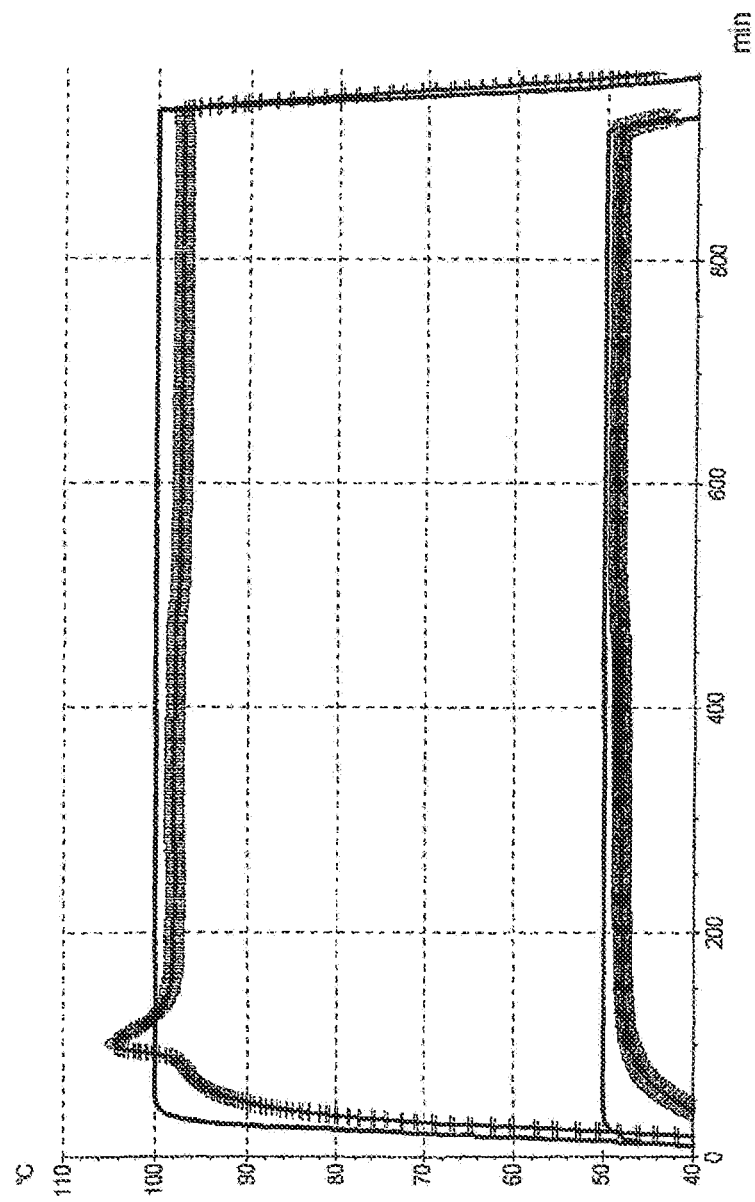
Figure 5:
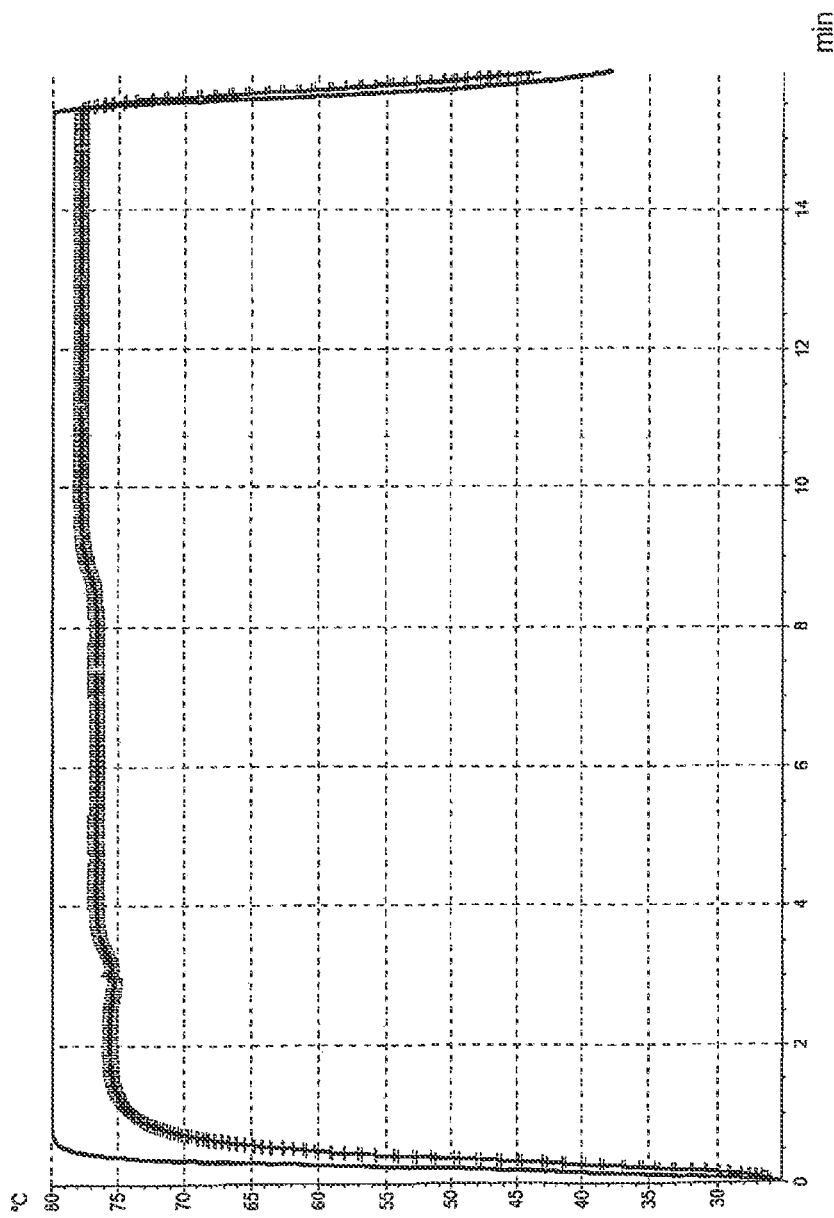

Shown are in:

FIG. 1: the thermal behavior during storage of the metal powder according to Example 1 in NMP at 80° C. and 100° C. furnace temperature (−) and sample temperature (+, A);

FIG. 2: the thermal behavior during storage of the metal powder according to comparison example 1 in NMP at 50° C. furnace temperature (−) and sample temperature (+);

FIG. 3: the thermal behavior during storage of a metal powder (Na content 17 ppm) obtained according to Example 1 in NMP with a water content of 1%, furnace temperature (−) and sample temperature (+, A);

FIG. 4: the thermal behavior during storage of a metal powder having an Na content of 55 ppm obtain according to Example 1 at 50° C. and 100° C. furnace temperature (−) and sample temperature (+, x) in NMP (148 ppm water content);

FIG. 5: the thermal behavior during storage of a metal powder having an Na content of 55 ppm obtained according to Example 1 at 80° C. furnace temperature (−) and sample temperature (+) in NMP (200 ppm water content).

EXAMPLE 1

Preparation of a lithium metal powder poor in sodium and passivated with linseed oil 399 g Shellsol D 100 and 19.4 g lithium metal bar sections are filled into a dry 2 L noble metal double jacket reactor that was rendered inert. The lithium has a sodium content of 17 ppm. Stirring very slowly (ca. 50 rpm), the jacket heater raises the inside temperature to 205° C. Using a syringe, 0.05 g linseed oil is then added. The agitation frequency is raised to 3600 rpm and maintained for 6 minutes. The agitator is then brought to a halt and the suspension cooled to room temperature.

The suspension is drained onto a vacuum filter, the filter residue is washed multiple times with hexane until it is free of oil, then vacuum-dried.

Yield: 15.6 g (80% of the theory)

Mean particle size: ca. 50 μm (image evaluation under SEM)

COMPARISON EXAMPLE 1

Preparation of lithium metal powder passivated with linseed oil 525 g Shellsol D 100 and 32.3 g lithium metal bar sections and 0.11 g sodium are filled into a dry 2 L noble metal double jacket reactor that was rendered inert and is equipped with a dispersion agitation system. The lithium has a sodium content of 17 ppm. Stirring very slowly (ca. 50 rpm), the jacket heater raises the inside temperature to 205° C. Using a syringe, 0.09 g linseed oil is then added. The agitation frequency is raised to 3600 rpm and maintained for 6 minutes. The agitator is then brought to a halt and the suspension cooled to room temperature.

The suspension is drained onto a vacuum filter, the filter residue is washed multiple times with hexane until it is free of oil, then vacuum-dried.

Yield: 27.3 g (84% of the theory)

Mean particle size: ca. 50 μm (image evaluation under SEM)

Na content (FES): 0.3%

EXAMPLE 2

Storage of a metal powder according to the invention from Example 1 in NMP at 80° C. and 100° C. (DSC test) Instrumentation by the company Systag, Switzerland (the Redex system) was used for the differential scanning calorimetry (DSC) testing. Under a protective gas atmosphere, approximately 2 g NMP and 0.1 g lithium metal powder were weighed into the sample vessels. Samples were stored at certain temperatures tor 15 hours.

COMPARISON EXAMPLE 2

Storage of the metal powder that is not according to the invention from Comparison Example 1 in NMP at 50° C. (DSC test) Example 2 and Comparison Example 2 demonstrate the substantially improved stability of the lithium 7 metal powder according to the invention in contact with NMP: while the product according to the invention did not cause any significant exothermal effects at storage at 80° C., nor at 100° C. (the sample temperature remains visibly below the furnace temperature throughout the entire observation period), the metal powder that is not according to the invention shows already at storage at 50° C. a visible exothermal reaction. This can be recognized in that the sample temperature clearly exceeds the furnace temperature.

EXAMPLE 3

Storage of the metal powder according to the invention (Na content 17 ppm) from Example 1 in NMP having a water content of 1% (DSC test).

The especially preferred Li metal powder having an Na content of 17 ppm proves kinetically stable even in water-rich NMP.

EXAMPLE 4

Storage of a lithium metal power prepared according to the invention having an Na content of 55 ppm at 50° C. and 100° C. in NMP (148 ppm water content) (DSC test)

EXAMPLE 5

Storage of a lithium metal power prepared according to the invention having an Na content of 55 ppm at 80° C. in NMP (200 ppm water content) (DSC test).

The metal powder having a sodium content of 55 ppm is stable at storage temperatures of 50° C. and 80° C.; at 100° C., however, it shows an exothermal, but not a run-away effect. According to the DSC experiment at 100° C., 73% of the used lithium is still present in metallic form.

That which is claimed is:

1. A method for preparing a stabilized lithium metal powder which does not show any runaway phenomenon when in contact with N-methyl-2-pyrrolidone having a water content of less than about 200 ppm at a minimum of 15 hours storage at 50° C., the method comprising:
    reacting lithium metal having less than 200 ppm of metallic contamination above 180° C. in an organic, inert solvent under dispersal conditions with a passivation agent containing one or a plurality of fatty acids and/or one or a plurality of fatty acid esters according to formula I $$R\text{—}COOR' \qquad (I),$$

wherein R denotes $C_{10}$-$C_{29}$ moieties and R' stands for $C_1$-$C_8$ moieties, wherein the passivation agent comprises an ethylate, a propanolate, and/or a butylate, and
    prelithiating an electrochemically active material with the stabilized lithium metal powder.

2. The method for preparing a stabilized lithium metal powder according to claim 1, wherein the passivation agent is an ester of an unsaturated fatty acid selected from the group consisting of oleic acid, stearic acid, palmitic acid, lauric acid, myristinic acid, margaric acid, palmitoleic acid, linolic acid and linolenic acid.

3. The method for preparing a stabilized lithium powder according to claim 1, wherein the passivation agent comprises esters of at least two unsaturated fatty acids selected from the group consisting of oleic acid, stearic acid, palmitic acid, lauric acid, myristinic acid, margaric acid, palmitoleic acid, linolic acid and linolenic acid.

4. The method for preparing a stabilized lithium powder according to claim 1, wherein the passivation agent comprises a triglyceride.

5. The method for preparing a stabilized lithium powder according to claim 1, wherein the electro-chemically active material is selected from the group consisting of graphite, alloy and a conversion anode for a lithium battery.

6. The method for preparing a stabilized lithium powder according to claim 1, wherein the passivation agent comprises a natural oil.

7. The method for preparing a stabilized lithium powder according to claim 1, wherein the passivation agent comprises a natural oil selected from the group consisting of rapeseed oil, olive oil, sunflower oil and linseed oil.

8. The method according to claim 1, wherein the passivation agent is used in quantities of 0.1 g to 50 g per kg lithium metal.

9. The method according to claim 1, wherein the organic, inert solvent is one or more hydrocarbons, selected from the group consisting of hexane, heptane, octane, decane, undecane, dodecane, toluene, ethyl benzene, cumene, and mixtures.

10. The method according to claim 1, further comprising coating the stabilized lithium metal powder at temperatures <180.5° C.

* * * * *